United States Patent [19]

Carstens

[11] 4,231,689
[45] Nov. 4, 1980

[54] AIR-ACTUATED PIPELINE TRANSPORTATION SYSTEM WITH WHEELED VEHICLES

[75] Inventor: Marion R. Carstens, Atlanta, Ga.

[73] Assignee: Georgia Tech Research Institute, Atlanta, Ga.

[21] Appl. No.: 757,508

[22] Filed: Jan. 12, 1977

Related U.S. Application Data

[63] Continuation-in-part of Ser. No. 656,022, Feb. 6, 1976, abandoned.

[51] Int. Cl.³ .............................................. B65G 51/04
[52] U.S. Cl. ...................................... 406/155; 15/3.5; 15/104.06 R; 406/185
[58] Field of Search ...................... 243/32, 33, 38, 39, 243/2, 4, 6, 9, 12, 14, 15, 23, 28; 302/2 R; 104/138 R, 138 G, 139, 147 R, 155, 243; 105/365; 15/104.06 R, 104.06 A, 3.5, 3.51, 3.52; 406/155, 185; 138/92

[56] References Cited

U.S. PATENT DOCUMENTS

| 847,234 | 3/1907 | Burton | 243/33 |
|---|---|---|---|
| 1,080,538 | 12/1913 | Collins | 243/33 |
| 2,135,355 | 11/1938 | Scanlan | 243/12 |
| 2,928,357 | 3/1960 | McBride | 104/138 G |
| 3,419,209 | 12/1968 | Munn | 302/2 R |
| 3,734,428 | 5/1973 | Alexandrov et al. | 243/33 |
| 3,797,405 | 3/1974 | Carstens et al. | 104/155 |
| 3,820,740 | 6/1974 | Alexandrov et al. | 243/33 |
| 3,870,250 | 3/1975 | Teodorescu et al. | 243/4 |
| 3,921,533 | 11/1975 | Szenasi et al. | 104/138 R |

FOREIGN PATENT DOCUMENTS

| 550350 | 8/1956 | Belgium | 243/33 |
|---|---|---|---|
| 379488 | 7/1973 | U.S.S.R. | 243/33 |

Primary Examiner—Jeffrey V. Nase
Attorney, Agent, or Firm—Newton, Hopkins & Ormsby

[57] ABSTRACT

A pipeline transportation system for wheeled vehicles which are moved therethrough by air. The vehicle functions as a pipeline sweeper to remove debris from the pipeline through one or more openings provided in the bottom of the pipeline. In one embodiment, the vehicle is self-righting whereby the vehicle will maintain an upright attitude and the vehicle wheels will straddle the openings in the pipeline and pass over the openings without the wheels being caught in the openings. In another embodiment, the vehicle includes loading wheels adjacent the bottom of the vehicle and side wheels on either side of the loading wheels, and the opening in the pipeline is positioned in the path of movement of the load wheels but out of the path of movement of the side wheels whereby debris will fall out of the opening but the vehicle will roll over the openings on the side wheels. Additionally, the vehicle may be self-righting with little loss of power or wheel wear by providing side wheels which are toed outwardly and which only engage the interior of the pipeline when the vehicle is unduly rotated.

26 Claims, 9 Drawing Figures

AIR-ACTUATED PIPELINE TRANSPORTATION SYSTEM WITH WHEELED VEHICLES

RELATED APPLICATION

This application is a continuation-in-part of U.S. patent application Ser. No. 656,022, filed Feb. 6, 1976, entitled Air-Actuated Pipeline Transportation System With Wheeled Vehicles, now abandoned.

BACKGROUND OF THE INVENTION

The use of an air-actuated pipeline system for moving wheeled vehicles is generally old as shown in U.S. Pat. Nos. 3,797,405 and 3,881,425. However, any debris in the pipeline will tend to interfere with the movement of the vehicles. Since such systems are well suited for the transportation of particulate solids, there exists the possibility of inadvertent spillage of such solids in the pipeline. One feature of the present invention is the provision of means for removing particles or debris from the pipeline. The wheeled vehicles have a round cross-sectional area similar to but smaller than the interior of the pipeline and may function as pipeline sweepers. That is, the pressure is greater on the rear of the vehicle than on the front and some air flows around the vehicles to blow smaller particles ahead of the vehicle. Those particles which are too large to be blown ahead of the vehicle will collide with the vehicle and will be rolled and slid ahead of the vehicle. The additional energy required to move particles by rolling and sliding by the vehicle plus the possibility of a larger particle wedging the vehicle against the pipe walls are incentives to remove spilled material and debris from the pipeline as quickly as possible.

Furthermore, in order to prevent any vehicle from turning over in the pipeline and spilling its load in the pipeline, it is desirable that the vehicles maintain an upright running attitude. While vehicles having toed out wheels for self-righting a vehicle have been provided in the past, such as disclosed in U.S. Pat. No. 2,928,357, such toed out load wheels are not automatic, but required control lines connected to the vehicle and actuated from outside the line. The present invention provides an automatic self-righting vehicle using toed out wheels but overcomes the objections of the prior art.

SUMMARY

The present invention is directed to an air-actuated pipeline transportation system having wheeled vehicles. One of the features of the present invention is the provision of means for removing debris from the pipeline. The vehicles normally move through the pipeline on load wheels adjacent the bottom of the vehicles. The present invention includes providing an opening or openings in the bottom of the pipeline which should be larger than the largest particle falling into the line. This will generally require that the openings be wider than the width of a load wheel. In one embodiment, the load wheels are spaced apart a distance greater than the width of the openings and the wheels are toed outwardly in the direction of movement of the vehicle whereby the vehicle will maintain an upright position and the load wheels will then straddle the openings and the vehicle will pass over the openings without the wheels being caught in the openings. In another embodiment, side wheels are connected to the vehicles and as the vehicles pass over the opening in the pipe, the weight of the vehicle will be carried by the side wheels which are positioned to straddle the openings and carry the load wheels over the openings without the load wheels catching in the opening while the debris will be blown out of the pipeline openings by air and by being pushed out by the vehicle.

A still further object of the present invention is the provision of additional means to reduce any tendency of the vehicle to be jarred or bumped as it passes over the openings. First, it is desirable that the side wheels normally extend radially outwardly from the vehicle toward the interior of the pipeline a distance less than the load wheels so that they do not normally contact the pipeline and thus avoid increasing the rolling friction of the vehicle. An elevated track is provided on either side of the opening positioned to engage the side wheels as the vehicle passes over the openings and preferably the leading and trailing edges of the tracks include ramps between the tracks and the interior of the pipeline to reduce any tendency of the vehicle to bump as the side wheels engage the tracks. Additionally, the upstream and downstream side of the openings may also include ramps which are positioned to be engaged by the load wheels in the event that a load wheel does drop slightly below the bottom of the interior of the pipeline while passing over the openings.

A still further object of the present invention is the provision of adjustably connecting the tracks relative to the interior of the pipeline in order that the tracks may be adjustably moved relative to the interior of the pipeline for smoothly carrying the vehicle over the opening.

A still further object of the present invention is the provision of spacing an opening downstream, but adjacent to any loader or unloader in the pipeline as these are the areas in the pipeline in which debris or material are more likely to be located.

A still further object of the present invention is the provision of means for maintaining the vehicle in an upright position or in an acceptable running attitude in order to prevent the vehicle from rotating in the pipeline and dumping part of its load into the pipeline or even turning over in the pipeline. In one embodiment, the load wheels are toed outwardly in the direction of movement of the vehicle and act to maintain an upright position, although this will increase the rolling resistance of the vehicle as well as increasing the wear on the load wheels. In another embodiment, the side wheels act to maintain the vehicle in an upright position by toeing the side wheels outwardly in the direction of movement of the vehicle through the pipeline. However, by extending the side wheels outwardly from the vehicle a distance less than the load wheels the side wheels are normally positioned out of contact with the interior of the conduit when the vehicle is upright and thereby avoid unnecessary rolling resistance and wearing of the side wheels. However, one of the toed out side wheels will engage the interior of the conduit to act to right the vehicle when the vehicle rotates a predetermined amount about its horizontal axis. Thus, the vehicle may include two load wheels and two side wheels at each end of the vehicle and preferably the plane containing each wheel extends radially outwardly from the longitudinal axis of the vehicle.

Other and further objects, features and advantages will be apparent from the following description of a presently preferred embodiment, given for the purpose of disclosure and taken in conjunction with the accompanying drawings.

DESCRIPTION OF THE PREFERRED EMBODIMENT

Figures 1, 2:
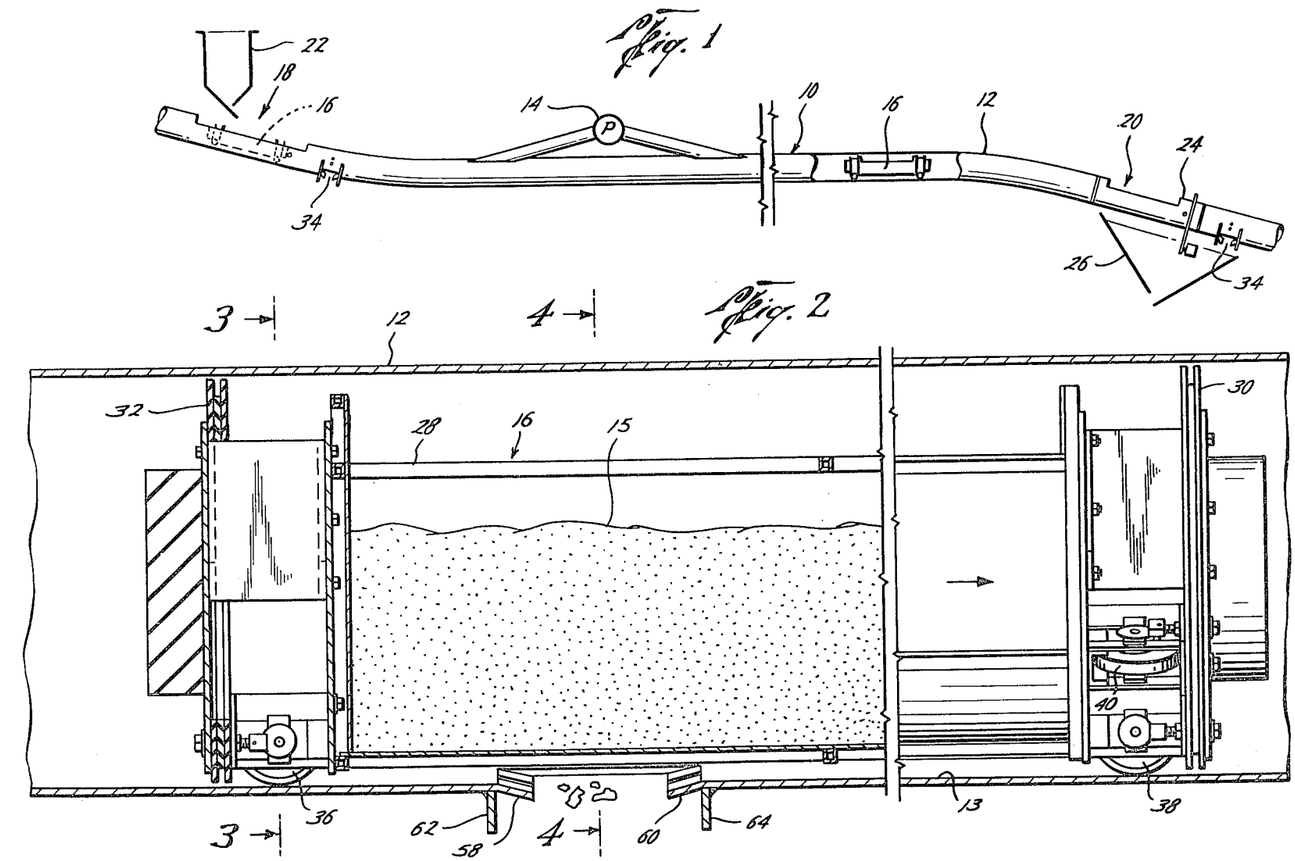
FIG. 1 is an elevational view of a typical air-actuated pipeline transportation system for moving wheeled vehicles therethrough.
FIG. 2 is an enlarged cross-sectional elevational view, of one embodiment of the improved vehicle of the present invention and means for removing debris from the pipeline.

Referring to the drawings, and particularly to FIG. 1, the present invention may be used in any suitable air-actuated pipeline system having wheeled vehicles, and for purposes of illustration only is referred to generally by the numeral 10 and includes a tubular conduit or pipeline 12 having a suitable pump 14 for creating a flow of air through the pipeline 12 for moving one or more wheeled vehicles 16 therethrough. Similar pipeline systems are shown in U.S. Pat. Nos. 3,797,405 and 3,881,425. Normally, such pipeline transportation systems 10 generally include a loading station generally indicated by the reference numeral 18 and an unloading station generally represented by the reference numeral 20. Such systems 10 are particularly suited for the transportation of particulate solids and in such event the loading station 18 may include a hopper 22 for filling a vehicle 16 positioned in the loading station 18. The unloading station 20 may include unloading means 24, such as described more fully in U.S. Pat. No. 3,724,690 for receiving a vehicle, inverting the vehicle, and dumping the transported material to a receiver 26 and then righting the emptied vehicle.

Referring now to FIG. 2, the vehicle 16 normally includes a body 28 having a round cross-sectional area similar in shape but smaller than the interior of the conduit 12 such as by providing end plates 30 and 32 at the forward and rear ends, respectively, of the body 16 on which the air moving through the pipeline 12 acts to push the vehicle 16 through the pipeline 12. Material particles or debris 15, such as that being carried by the system 10, occasionally are present in the pipeline 12 such as caused by inadvertent spillage when loading or unloading the vehicle 16. The vehicle 16 functions as a pipeline sweeper to move debris or particles in the pipeline 12 along the interior of the pipeline 12 since air flows around the periphery of the end plates 30 and 32 sufficiently to blow small particles along the pipeline 12, and particles which are too large to be blown collide with the front end plate 30 and will be rolled along or slid ahead of the vehicle 16 as it is moved through the pipeline 12. However, debris in the pipeline requires additional energy to move the vehicle along the pipeline 12 and particles not removed could catch between the vehicles 16 and the interior of the pipeline 12 and wedge the vehicle 16 against the pipeline.

One feature of the present invention is the provision of one or more openings 34 positioned in the bottom of the pipeline 12 to allow debris to fall through the openings 34 and be discharged from the interior of the pipeline 12. Preferably, the openings 34 should be larger than the largest particle normally carried in the system 10. However, the vehicle 16 is moved through the pipeline on a plurality of load carrying wheels adjacent the bottom of the vehicle 16, for example two load carrying wheels 36 and 38 at each end of the vehicle 16. In order to make the openings 34 sufficiently large to allow the passage of large particles, the openings 34 should be of a width larger than the width of the load wheels 36 and 38. Of course, with the openings 34 being larger than the width of the load wheels and positioned in the bottom of the pipeline 12, the load wheels could become caught in the openings 34 as the vehicle passes the openings 34.

Figure 7:
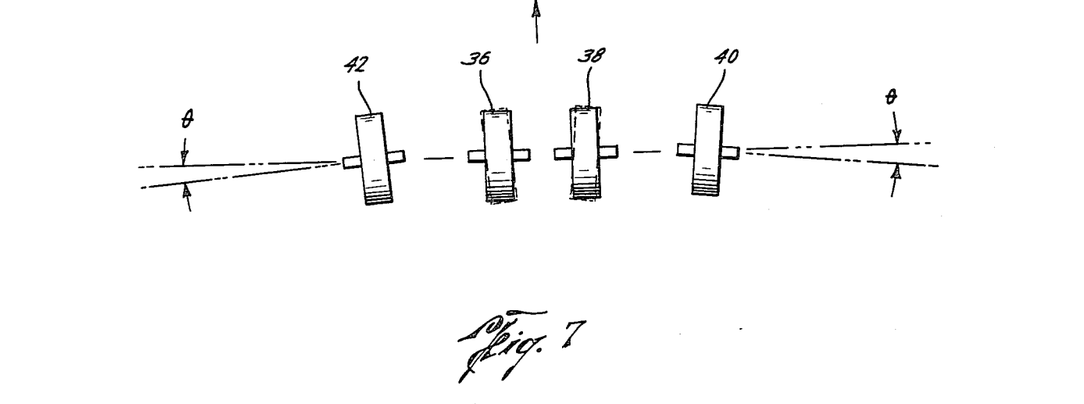
FIG. 7 is a cross-sectional view taken along the line 7—7 of FIG. 6.
Figures 8, 9:
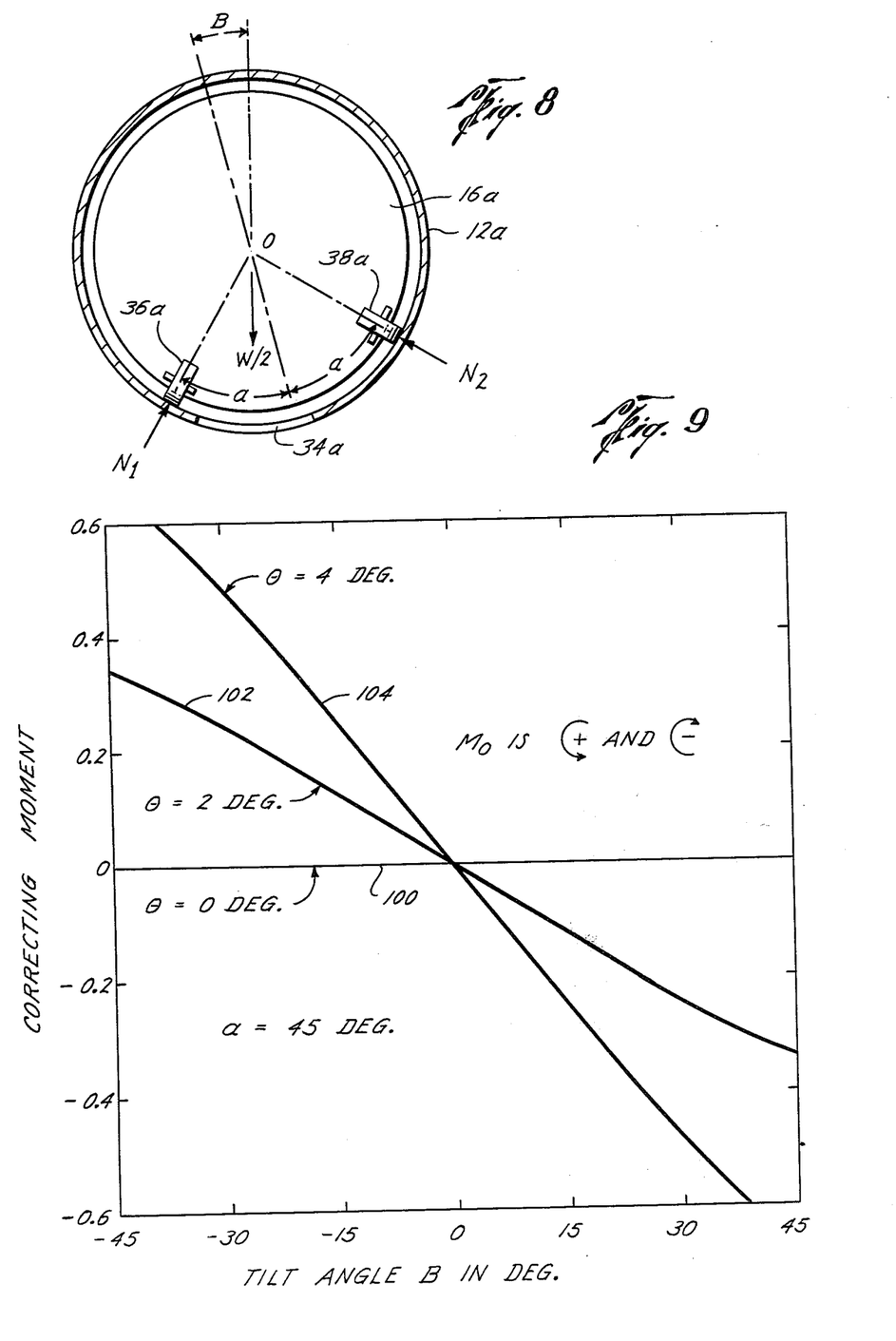
FIG. 8 is a schematic elevational view of the preferred wheel structure, showing the righting action when the vehicle has undesirably rotated in the pipeline.
FIG. 9 is a chart illustrating the righting moment applied to the vehicle of FIG. 8 at various toe out angles versus the tilting angle of the vehicle.

Referring now to FIG. 8, the preferred embodiment of the present invention is best seen, which shows a schematic elevational view of the one end of a vehicle 16a, the other end of which may be identical, having two load carrying wheels 36a and 38a moving through the pipeline 12a having an opening 34a therein and shown tipped at an angle B from the upright or vertical attitude. It is important that the vehicle 16a maintain an upright position as it moves through the pipeline 12a and does not rotate around its horizontal axis in order to avoid spilling the load into the pipeline 12a and in order that the wheels 36a and 38a avoid catching in the opening 34a. To accomplish this the wheels 36a and 38a are toed outwardly in the direction of travel of the vehicle at an angle $\theta$, similar to that shown in FIG. 7 as will be discussed later. A normal force N1 is exerted on the wheel 36a by the pipeline and a normal force N2 is exerted on the wheel 38a by the pipeline 12a. The wheels 36a and 38a are normally positioned an angular distance a from the vertical axis of the vehicle 16a. If the vehicle 16a becomes undesirably tipped at an angle B from the vertical as shown in FIG. 8, the normal force N1 and N2 will be unequal. The calculation for the relative forces is as follows:

$$\frac{N1}{N2} = \frac{\sin(a+B)}{\sin(a-B)}$$

Therefore, with the vehicle being tipped at an angle B, the normal force N1 will be greater than the normal force N2. The greater force acting against wheel 36a will induce an attitude correcting moment to bring the vehicle 16a back to an upright attitude which will not only prevent spillage from the vehicle but will allow the wheels 36a and 38a to straddle the opening and pass by the opening 34a without the wheels 36a and 38a becoming caught in the opening 34a. Referring now to FIG. 9, graphs 100, 102 and 104 illustrate the attitude correcting moment versus the tilt angle B for toe out angles $\theta$ in the amounts of 0 degrees, 2 degrees, and 4 degrees, respectively, for an angle a of 45 degrees. Generally, it has been found that small toe out angles $\theta$ such as one or two degrees is sufficient to maintain the vehicle in an upright position while also reducing the undesirable wear on the toed out wheels 36a and 38a.

Preferably, the planes of the wheels 36a and 38a extend through the horizontal axis of the vehicle 16a and preferably the angle between the wheels 36a and 38a, which is 2a, is approximately 90 degrees. Wide angles 2a are superior for vehicle stability and ability to pass over debris, but are inferior from the standpoint of increasing rolling friction. With the angular extent of 90 between the wheels 36a and 38a, the angular extent of opening 34a may be made as wide as 60 degrees without the likelihood of the toed out wheels catching therein.

Figures 3, 4, 5:
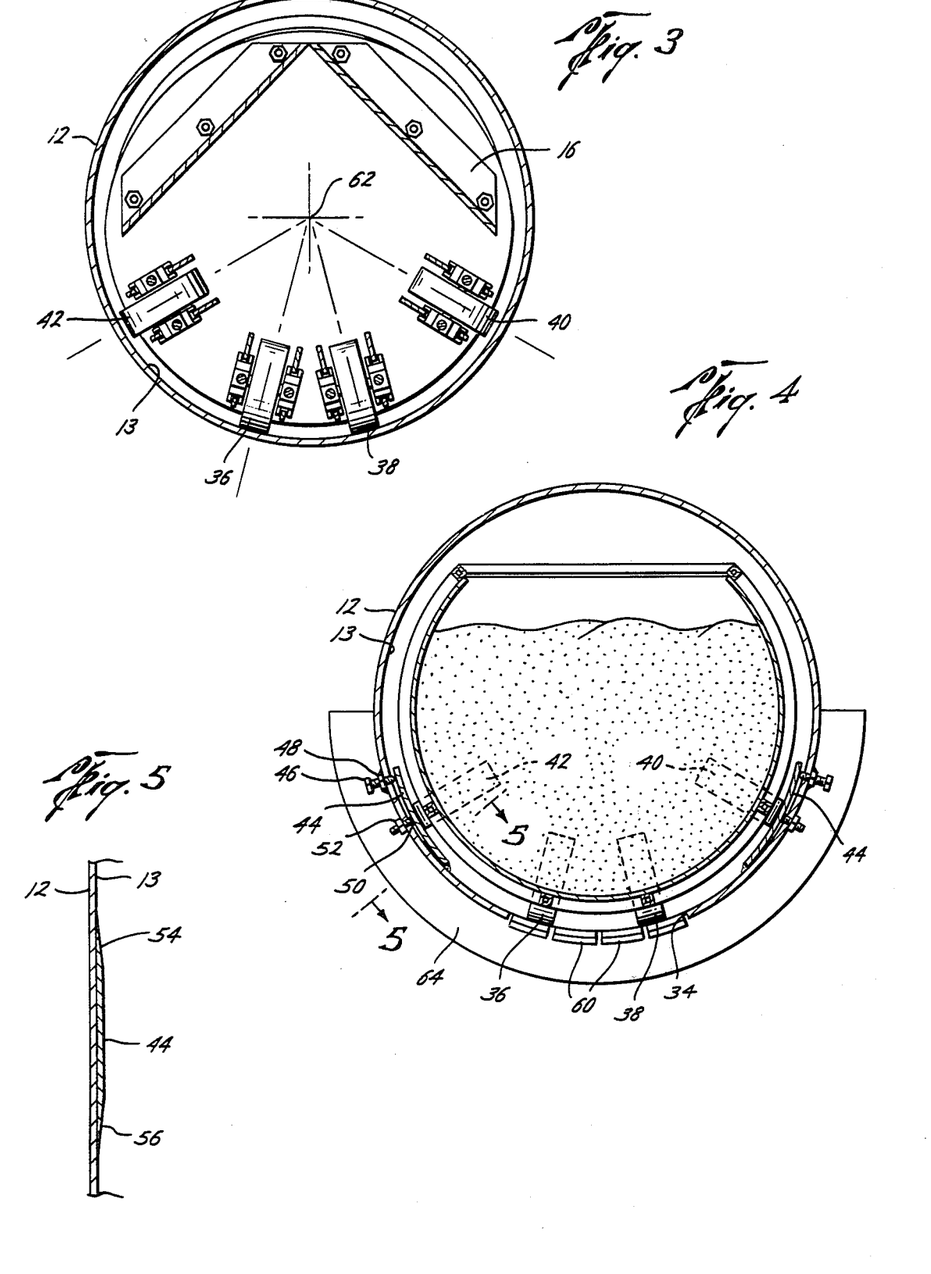
FIG. 3 is a cross-sectional view taken along the line 3—3 of FIG. 2.
FIG. 4 is a cross-sectional view taken along the line 4—4 of FIG. 2.
FIG. 5 is a cross-sectional view taken along the line 5—5 of FIG. 4.

Referring now to FIGS. 2, 3 and 4, another embodiment is shown for preventing the load wheels 36 and 38 from catching in the openings 34 in which a pair of side wheels 40 and 42 are provided connected to the vehicle 16. One of the side wheels 40 is positioned on one side of both of the load wheels 36 and 38 and the second of the side wheels 42 is positioned on the opposite side of both the load wheels 36 and 38. As best seen in FIG. 4, the side wheels 40 and 42 are angularly spaced at a distance greater than the width of the openings 34 and thus the side wheels 40 and 42 can carry the weight of the vehicle 16 as the vehicle 16 passes over the openings 34 and the load wheels 36 and 38 will pass over the openings 34 without catching therein.

While the side wheels 40 and 42 could extend outwardly from the vehicle 16 the same distance as the load wheels 36 and 38, it is preferable to avoid the additional rolling resistance of the wheels 40 and 42 as well as other reasons which will be more fully discussed hereinafter, and instead the outer peripheries of the side wheels 40 and 42, as best seen in FIGS. 3 and 4, extend outwardly from the vehicle 16 a lesser amount than the outer peripheries of the load wheels 36 and 38. Therefore, when the vehicle 16 is in its normal upright position, the side wheels 40 and 42 do not engage the interior 13 of the pipeline 12. In this running attitude, the shift of the weight from the load wheels 36 and 38 to the side wheels 40 and 42, when a vehicle 16 passes over an opening 34, may be accomplished by providing a curved track 44 on each side of each opening 34 and positioned to engage the side wheels 40 and 42. The added thickness of the tracks 44 should be such as to allow the shift in load to the side wheels 40 and 42 without undesirably bumping or impacting the vehicle 12 in order to avoid spillage from the vehicle 16. Preferably, the tracks 44 are adjustably connected to the interior 13 of the pipeline 12 so that the tracks 44 may be adjusted to carry all of the wheels smoothly over the opening 34. For example, a plurality of bolts 46 may threadably engage the pipeline 12 to adjust the tracks 44 inwardly and thereafter the bolts 46 are locked into place by nuts 48. For adjusting the tracks 44 outwardly, bolts 50 are secured to the tracks and extend through the pipeline 12 and are held outwardly by nuts 52. As best seen in FIG. 5, in order to avoid any bumping of the vehicle 12 as it engages or leaves the tracks 44, a ramp 54 is provided at the upstream edge of each track 44 between the interior 13 of the pipeline 12 and the leading edge of the tracks 44. Similarly, a ramp 56 is provided at the downstream end of the tracks 44 joining the interior surface 13 of the pipeline 12 and the trailing edge of the tracks 44.

Additionally, the upstream and downstream ends of the openings 34 may be provided with inclined ramps in the event that the load wheels 36 and 38 have a tendency to sag into the openings 34. Referring to FIGS. 2 and 4, an opening ramp 58 may be provided on the upstream side of each opening 34 leading downwardly into the opening 34, and a downstream ramp 60 may be provided leading upwardly from the opening 34 towards the interior 13 of the pipeline 12. Thus, the opening ramps 58 and 60 are available to provide a gradual engagement by the load wheels 36 and 38 in the event that they move downwardly into the openings 34.

If desired, exterior stiffening rings 62 and 64 may be provided at either end of the openings 34 and secured to the pipeline 12 to insure the dimensional integrity of the interior 13 of the pipeline 12.

While as many openings 34 may be provided in the pipeline 12 where desired, it is preferable that an opening 34 be located immediately downstream but adjacent to both the loader 22 and the unloader 24 since these are the areas that are most likely to create entrance of material into the pipeline 12. Furthermore, while not shown, a mechanical pusher may be used at both the loading station 18 and the unloading station 20 to start a vehicle from the stop position, and therefore this external pushing force will insure that the vehicle is placed in motion and that the leading wheels will cross the openings 34. Secondly, since the vehicles are started from rest, the vehicle velocity will be small when the wheels pass over the openings 34 which is helpful in providing for the necessary thrust capacity of the side wheels inasmuch as bearing capacity decreases with angular speeds.

Figure 6:
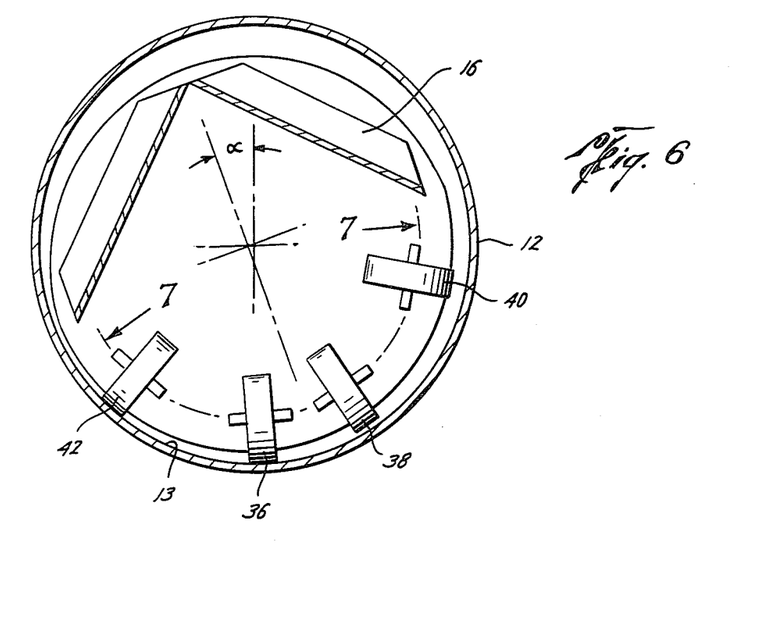
FIG. 6 is a schematic elevational view of the wheel structure, similar to FIG. 3, showing the righting action of a side wheel when the vehicle has undesirably rotated in the pipeline.

However, as previously mentioned, it is also desirable that the vehicles 16 maintain an upright position as they move through the pipeline 12 and do not rotate around their horizontal axis so as to spill the load 15 into the pipeline 12 or turn over. U.S. Pat. No. 2,928,357 illustrates the use of an external control system for toeing out load wheels for maintaining an acceptable running attitude. While toed out load wheels as shown in FIG. 8 automatically act to right the vehicle, when it undesirably rotates, the use of toed out load wheels are always in contact with the interior of the pipe wall does increase the rolling resistance due to partial skidding of the wheels and also increases wear on the wheels. In the embodiment of FIGS. 3-7, the side wheels 40 and 42 are provided which do no radially extend outwardly as far as the load wheels 36 and 38 and therefore as best seen in FIG. 3 do not normally engage the interior 13 of the pipe 12 if the vehicle 16 is in the upright position. Preferably, only the side wheels 40 and 42 are toed outwardly in the direction of movement of the vehicle 16. Therefore, the vehicle would have to rotate to an angle greater than half the angular distance between load wheels 36 and 38 before the vehicle 16 would be tilted enough to bring one of the side wheels 40 or 42 into contact with the interior 13 of the pipe 12. Referring now to FIG. 6, the schematic view of the wheels is shown in which the vehicle 16 is rotated sufficiently to bring side wheel 42 into engagement with the interior 13 of the pipe 12. When the toed out side wheel 42 contacts the interior of the conduit 12, the wheel 42 will act to right the vehicle 16. The advantage of the configuration of the present invention is that the side wheels 40 and 42 do not normally contact the interior 13 of the pipeline 12 and thus do not normally add rolling friction and wear of the wheels 40 and 42 to the system except when they are needed to right the vehicle 16. As indicated, it is preferable not to toe out the load wheels 36 and 38 in this embodiment, but, if desired, the load wheels 36 and 38 may be towed out as indicated in the dotted outlines in FIG. 7 the same as in the preferred embodiment of FIG. 8.

In addition, the particular configuration of the wheels shown advantageously maintains the vehicles 16 in the upright position to allow proper coaction and alignment of the vehicles 16 with the debris openings 34.

In the embodiment of FIGS. 3-7, it is preferable that the planes of the wheels 36, 38, 40 and 42 extend through the longitudinal axis 62 of the vehicle 16. In addition, all of the wheels extend radially outwardly and downwardly from the vehicle 16 and preferably the vehicle 16 includes two load wheels 36 and 38 and two side wheels 40 and 42 at each end of the vehicle 16. In the preferred embodiment, the load wheels are separated by approximately thirty angular degrees and the side wheels are each separated approximately forty-five degrees from a load wheel.

The present invention, therefore, is well adapted to carry out the objects and attain the ends and advantages mentioned as well as others inherent therein. While a presently preferred embodiment has been given for the purpose of disclosure, numerous changes may be made without departing from the spirit and scope of the invention as hereinafter claimed.

What is claimed is:

1. An air-actuated pipeline transportation system comprising,
    a vehicle comprising,
        a vehicle body having a generally round cross-sectional area,
        a plurality of load carrying wheels connected to the vehicle adjacent the bottom of the vehicle body for supporting the vehicle for movement through the pipeline,
        at least two side wheels connected to the vehicle body, one of said side wheels positioned on one side of the load wheels and the second of said side wheels positioned on the opposite side of the load wheels, the radial extent of the outer periphery of the side wheels from the longitudinal axis of the vehicle body being less than the radial extent of the outer periphery of the load wheels whereby the side wheels are normally positioned out of contact with the interior of the pipeline,
        each of said side wheels are toed outwardly in the direction of movement of the vehicle whereby the side wheels act to right the vehicle when the vehicle rotates sufficiently to bring one of the side wheels into contact with the interior of the pipeline,
    said pipeline including at least one opening in the bottom of the pipeline, said opening wider than the width of a load wheel and positioned in the path of movement of the load wheels but out of the path of movement of the side wheels whereby debris will fall out of the opening but the vehicle will pass over the opening.

2. The apparatus of claim 1 wherein the opening is wider than the distance between the load wheels at one end of the vehicle.

3. The apparatus of claim 1 including,
    a raised track on each side of the opening positioned to engage the side wheels.

4. The apparatus of claim 3 including,
    a ramp at the upstream end of each track between the interior of the pipeline and each track, and
    a ramp at the downstream end of each track between the interior of the pipeline and each track.

5. The apparatus of claim 3 wherein the raised tracks on either side of the opening are adjustably connected to the pipeline for adjusting the position of the tracks relative to the interior of the pipeline.

6. The apparatus of claim 1 including,
    a ramp at the upstream side of the opening leading downwardly from the interior of the pipeline, and
    a ramp at the downstream side of the opening leading upwardly towards the interior of the pipeline,
    said ramps allowing the passage of the load wheels over the opening with a minimum of impact to the vehicle.

7. The apparatus of claim 1 wherein the pipeline includes a vehicle loader and unloader and the opening is positioned downstream but adjacent to at least one of the loader and unloader.

8. The apparatus of claim 1 wherein said side wheels extend outwardly from the lower half of the vehicle body.

9. An air-actuated pipeline transportation system comprising,
    a vehicle including,
        a vehicle body having a generally round cross-sectional area,
        a plurality of load carrying wheels connected to the vehicle adjacent the bottom of the vehicle body adjacent each end of the vehicle body for supporting the vehicle for movement through the pipeline,
        two side wheels connected to the vehicle body adjacent each end of the vehicle, one of the wheels positioned on one side of the load wheels and the second of said side wheels positioned on the opposite side of the load wheels, the radial extent of the outer peripheries of the side wheels from the longitudinal axis of the vehicle body being less than the radial extent of the outer peripheries of the load wheels whereby the side wheels are normally positioned out of contact with the interior of the pipeline when the vehicle is upright but one of the side wheels engages the interior of the pipeline when the vehicle rotates about its horizontal axis,
        said side wheels being toed outwardly in the direction of movement of the vehicle whereby the side wheels act to right the vehicle when the vehicle rotates sufficiently to bring one of the side wheels into contact with the interior of the pipeline,
    said pipeline including at least one opening in the bottom of the pipeline, said opening being wider than the width of a load wheel and positioned in the path of movement of the load wheels but out of the path of movement of the side wheels whereby debris will fall out of the opening but the wheels will pass over the opening, and
    a raised track on each side of the opening on the interior of the pipeline positioned to engage the side wheels.

10. The apparatus of claim 9 wherein the opening is wider than the distance between the load wheels at one end of the vehicle.

11. The apparatus of claim 9 including, a ramp at the upstream end of each track between the interior of the pipeline and each track, and a ramp at the downstream end of each track between the interior of the pipeline and each track.

12. The apparatus of claim 9 including, a ramp at the upstream side of the opening leading downwardly from the interior of the pipeline, and a ramp at the downstream side of the opening leading upwardly towards the interior of the pipeline.

13. A self-righting vehicle for moving by air through a tubular round conduit comprising, a vehicle body having a generally round cross-sectional area, a plurality of load carrying wheels connected to the vehicle adjacent the bottom of the vehicle for supporting the vehicle for movement through the conduit, at least two side wheels connected to the vehicle, one of said side wheels positioned on one side of the load wheels and the second of said side wheels positioned on the other side of the load wheels, the radial extent of the outer periphery of each side wheel from the longitudinal axis of the vehicle body being less than the radial extent of the outer peripheries of the load wheels whereby the side wheels are positioned out of contact with the interior of the conduit when the vehicle is upright but one of the side wheels engages the interior of the conduit when the vehicle rotates about its horizontal axis, each of said side wheels being toed outwardly in the direction of movement of the vehicle whereby the side wheels act to right the vehicle when the vehicle rotates sufficiently to bring one of the side wheels into contact with the interior of the conduit.

14. The apparatus of claim 13 wherein the plane containing each wheel passes through the longitudinal axis of the vehicle.

15. The apparatus of claim 13 wherein each of said load wheels is toed outwardly in the direction of movement of the vehicle.

16. The apparatus of claim 13 wherein the load wheels and the side wheels each extend radially outwardly and downwardly from the vehicle.

17. The apparatus of claim 13 including two load wheels and two side wheels at each end of the vehicle.

18. The apparatus of claim 17 wherein the load wheels at each end are separated by approximately thirty angular degrees, and the side wheels are each spaced approximately forty-five degrees from a load wheel.

19. In a pipeline transportation system in which load carrying vehicles having a plurality of load carrying wheels adjacent the bottom of the vehicles and a side wheel positioned on opposite sides of the load wheels in which the vehicle is moved by air, the improvement in a pipeline debris removal system comprising, an opening in the bottom of the pipeline, said opening being wider than the width of a load wheel and positioned in the path of movement of the load wheels but out of the path of movement of the side wheels whereby debris will fall out of the opening but the vehicle will pass over the opening, a ramp at the upstream side of the opening leading downwardly from the interior of the pipeline, and a ramp at the downstream side of the opening leading upwardly towards the interior of the pipeline, said ramps allowing the passage of the load wheels over the opening with a minimum of impact to the vehicle.

20. In a pipeline transportation system in which load carrying vehicles having a plurality of load carrying wheels adjacent the bottom of the vehicles and a side wheel positioned on opposite sides of the load wheels in which the vehicle is moved by air, the improvement in a pipeline debris removal system comprising, an opening in the bottom of the pipeline, said opening being wider than the width of a load wheel and positioned in the path of movement of the load wheels but out of the path of movement of the side wheels whereby debris will fall out of the opening but the vehicle will pass over the opening, a raised track on either side of the opening positioned to engage the side wheels, said tracks on either side of the opening are adjustably connected to the pipeline for adjusting the position of the tracks relative to the interior of the pipeline.

21. In a pipeline transportation system in which load carrying vehicles having a plurality of load carrying wheels adjacent the bottom of the vehicles and a side wheel positioned on opposite sides of the load wheels in which the vehicle is moved by air, the improvement in a pipeline debris removal system comprising, an opening in the bottom of the pipeline, said opening being wider than the width of a load wheel and positioned in the path of movement of the load wheels but out of the path of movement of the side wheels whereby debris will fall out of the opening but the vehicle will pass over the opening, a raised track on either side of the opening positioned to engage the side of wheels, a ramp at the upstream end of each track between the track and the interior of the pipeline, and a ramp at the downstream end of each track between the track and the interior of the pipeline.

22. In a pipeline transportation system having a vehicle loader and a vehicle unloader in which load carrying vehicles having a plurality of load carrying wheels adjacent the bottom of the vehicles at each end of the vehicle and a side wheel positioned on opposite sides of the load wheels in which the vehicle is moved by air, the improvement in a pipeline debris removal system comprising, an opening in the bottom of the pipeline, said opening being wider than the width of a load carrying wheel and positioned in the path of movement of the load wheels but out of the path of movement of the side wheels whereby debris will fall out of the opening but the vehicle will pass over the opening, said opening positioned downstream but adjacent to at least one of the loader and unloader, a raised track on either side of the opening positioned to engage the side wheels, a ramp at the upstream end of each track, and a ramp at the downstream end of the track.

23. The apparatus of claim 22 wherein the opening is wider than the distance between the load wheels at one end of the vehicle.

24. An air-actuated pipeline transportation system comprising:

a vehicle body having a generally round cross-sectional area, a plurality of load carrying wheels connected to the vehicle body adjacent each end of the vehicle and adjacent the bottom of the vehicle for supporting the vehicle for movement through the conduit, two side wheels connected to the vehicle body adjacent each end of the vehicle, one of the wheels positioned on one side of the load wheels and the second of said side wheels positioned on the opposite side of said load wheels, said side wheels extending outwardly from the lower half of the vehicle body, two of the wheels at each end of the vehicle toed outwardly in the direction of movement of the vehicle for co-acting with the interior of the pipeline for maintaining the vehicle upright, said pipeline including at least one opening in the bottom of the pipeline, said opening being wider than the width of a load wheel and positioned in the path of movement of the load wheels, but out of the path of movement of the side wheels when the vehicle is upright whereby debris will fall out of the opening but the vehicle will be supported by the side wheels and pass over the opening, and a raised track on either side of the opening positioned to engage the side wheels.

25. An air actuated pipeline tranportation system having pump means with at least one pump connection connected to the pipeline for creating an air flow in the pipeline and including a vehicle comprising, a vehicle body having a generally round cross-sectional area, at least two load carrying wheels connected to the vehicle adjacent the bottom of the vehicle body adjacent each end of the body for supporting the vehicle for movement through the pipeline, at least one of the wheels on each side of the body toed outwardly in the direction of movement of the vehicle for coacting with the interior of the conduit for automatically maintaining the vehicle upright in said conduit, said pipeline including at least one opening in the bottom of the pipeline spaced from all of the pump connections to the pipeline, said opening being wider than the width of a wheel but less than the width of the distance between the wheels at each end of the body whereby an upright vehicle will pass over the opening without the wheels being caught in the opening and debris will fall out of the opening.

26. The apparatus of claim 25 wherein the angular distance between the wheels at each end of the vehicle is approximately ninety degrees.

* * * * *